(No Model.)

J. PHILLIPS & H. D. ALEXANDER.
END GATE FOR WAGONS.

No. 361,370. Patented Apr. 19, 1887.

WITNESSES:
Harry Frease
Frank S. Masters

INVENTORS
Henry D. Alexander
James Phillips
BY Fred W. Bonce
ATTORNEY

UNITED STATES PATENT OFFICE.

JAMES PHILLIPS AND HENRY D. ALEXANDER, OF CANTON, OHIO, ASSIGNORS OF ONE-THIRD TO WILLIAM J. PIERO, OF SAME PLACE.

END-GATE FOR WAGONS.

SPECIFICATION forming part of Letters Patent No. 361,370, dated April 19, 1887.

Application filed January 7, 1887. Serial No. 223,642. (No model.)

*To all whom it may concern:*

Be it known that we, JAMES PHILLIPS and HENRY D. ALEXANDER, citizens of the United States, residing at Canton, in the county of Stark and State of Ohio, have invented certain new and useful Improvements in Wagon End-Gates; and we do hereby declare that the following is a full, clear, and exact description of the same, reference being had to the annexed drawings, making a part of this specification, and to the letters and figures of reference marked thereon, in which—

Figure 1:
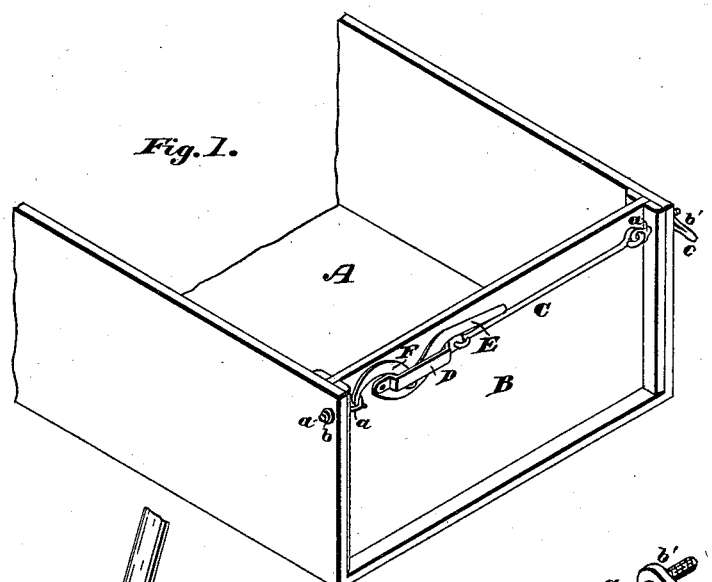
Figure 4:
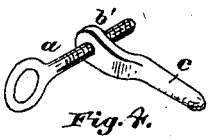
Figure 2:
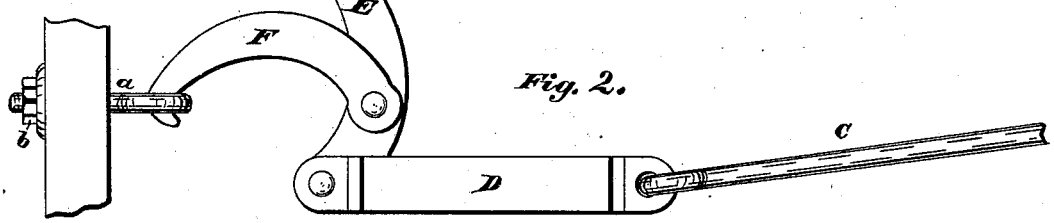
Figure 3:
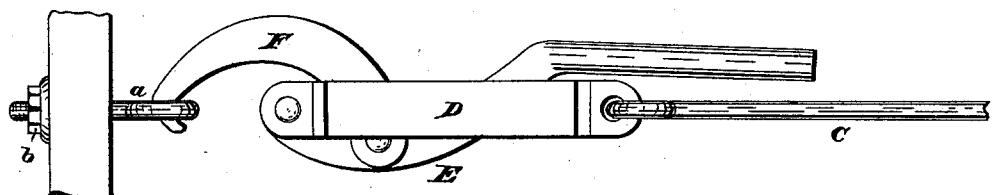

Figure 1 is a view of a portion of a wagon-box, showing end gate or board located therein, and manner of holding said end gate or board in position. Fig. 2 is a detached view of lock, showing the same open for the purpose of detaching the cross rod or bar. Fig. 3 is a detached view of the lock, showing it closed and in proper position for securely holding the end gate or board. Fig. 4 is a detached view of eyebolt.

The present invention has relation to wagon end-gates; and its nature consists in the different parts and combination of parts hereinafter described, and particularly pointed out in the claim.

Similar letters of reference indicate corresponding parts in all the figures of the drawings.

In the accompanying drawings, A represents the wagon-box, which may be constructed in the ordinary manner.

The rear end of the wagon-box A is provided with the end gate or board B, which may be located substantially as shown in Fig. 1.

The ends of the side boards are provided with the eyebolts $a$ $a$, and are located substantially as shown in Fig. 1. These eyebolts are provided with screw-threaded ends, which are for the purpose of receiving the bolts or nuts $b$ and $b'$. The bolt or nut $b'$ is provided with the handle or lever $c$, which is for the purpose of adjusting the eyebolts.

The rod or bar C is substantially of the form shown, and, as shown, one end of said rod or bar is attached to one of the eyebolts $a$. The other end of this rod or bar C is attached to the bar D. To the opposite end of the bar D is pivotally attached the curved or bent lever E, and to this bent or curved lever E is pivotally attached the hook F, said hook being substantially of the form shown in the drawings. The free end of the hook F is so formed that it will easily enter one of the eyebolts $a$, as shown in the drawings.

It will be seen that by our peculiar arrangement as the bent or curved lever E is forced downward it will bring or draw with it the hook F, thereby bringing or causing the sides of the wagon-box to press against the ends of the end gate or board B, and securely hold said end gate or board in proper position. It will also be seen that when the lever E is placed in the position shown in Figs. 1 and 3 the point or place of attaching the hook F will be below the pivoting-point of said lever, thereby securely locking the different parts.

When it is desired to remove the end gate or board B, the lever E is placed or thrown in the position shown in Fig. 2, when the hook F can be easily detached from the eyebolt $a$ and the locking device dropped out of the way, said parts hanging on the opposite eyebolt.

Having now fully described our invention, what we claim as new, and desire to secure by Letters Patent, is—

The combination of the box A, provided with the end-gate B, the eyebolts $a$ $a$, the rod or bar C, having attached thereto the bar D, the bent lever or handle E, pivotally attached to said bar D, and the hook F, pivotally attached to the lever or handle E, substantially as and for the purpose specified.

In testimony that we claim the above we have hereunto subscribed our names in the presence of two witnesses.

JAMES PHILLIPS.
HENRY D. ALEXANDER.

Witnesses:
FRED. W. BOND,
FRANK S. MARTIN.